(12) United States Patent
Watanabe et al.

(10) Patent No.: US 9,994,157 B2
(45) Date of Patent: Jun. 12, 2018

(54) PERIPHERY MONITORING APPARATUS AND PERIPHERY MONITORING SYSTEM

(71) Applicant: AISIN SEIKI KABUSHIKI KAISHA, Kariya-shi, Aichi-ken (JP)

(72) Inventors: Kazuya Watanabe, Anjo (JP); Tetsuya Maruoka, Okazaki (JP); Itsuko Ohashi, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 332 days.

(21) Appl. No.: 14/841,843

(22) Filed: Sep. 1, 2015

(65) Prior Publication Data

US 2016/0090044 A1    Mar. 31, 2016

(30) Foreign Application Priority Data

Sep. 26, 2014  (JP) ................. 2014-197562

(51) Int. Cl.
| | | |
|---|---|---|
| *B60R 1/12* | (2006.01) | |
| *B60R 1/00* | (2006.01) | |
| *G06T 3/00* | (2006.01) | |

(52) U.S. Cl.
CPC ............. *B60R 1/12* (2013.01); *B60R 1/006* (2013.01); *G06T 3/0025* (2013.01);
(Continued)

(58) Field of Classification Search
None
See application file for complete search history.

(56) References Cited

U.S. PATENT DOCUMENTS

2004/0196368 A1* 10/2004 Asai .................... B60R 1/00
                                                            348/148
2009/0009604 A1*  1/2009 Kanaoka ............. B60R 1/00
                                                            348/148
(Continued)

FOREIGN PATENT DOCUMENTS

EP    1465428 A1    10/2004
EP    2012271 A2     1/2009
(Continued)

OTHER PUBLICATIONS

Communication dated Mar. 8, 2016, from the European Patent Office in counterpart European Application No. 15183248.2.

*Primary Examiner* — Anand S Rao
*Assistant Examiner* — Tyler B Edwards
(74) *Attorney, Agent, or Firm* — Sughrue Mion, PLLC

(57) ABSTRACT

A periphery monitoring apparatus includes: an acquisition unit configured to acquire first image data that is captured by a first imaging unit provided on a left side of a vehicle body, and second image data that is captured by a second imaging unit provided on a right side of the vehicle body; and an output unit configured to combine third image data which is generated by rotating, and magnifying or minifying the first image data in such a way that a plurality of left reference points included in the first image data are respectively displayed at pre-set positions, and fourth image data which is generated by rotating, and magnifying or minifying the second image data in such a way that a plurality of right reference points included in the second image data are respectively displayed at pre-set positions, and to output the combined image data.

8 Claims, 14 Drawing Sheets

(52) U.S. Cl.
CPC . *B60R 2001/1253* (2013.01); *B60R 2300/105* (2013.01); *B60R 2300/303* (2013.01); *B60R 2300/306* (2013.01); *B60R 2300/607* (2013.01); *B60R 2300/806* (2013.01); *G06T 2207/30252* (2013.01)

(56) References Cited

U.S. PATENT DOCUMENTS

| | | | | |
|---|---|---|---|---|
| 2009/0121851 A1* | 5/2009 | Abe | ................... | G06T 3/4038 340/435 |
| 2015/0183371 A1* | 7/2015 | Okada | ................... | B60R 1/00 348/148 |

FOREIGN PATENT DOCUMENTS

| | | |
|---|---|---|
| JP | 2003-095028 A | 4/2003 |
| JP | 201449848 A | 3/2014 |

* cited by examiner

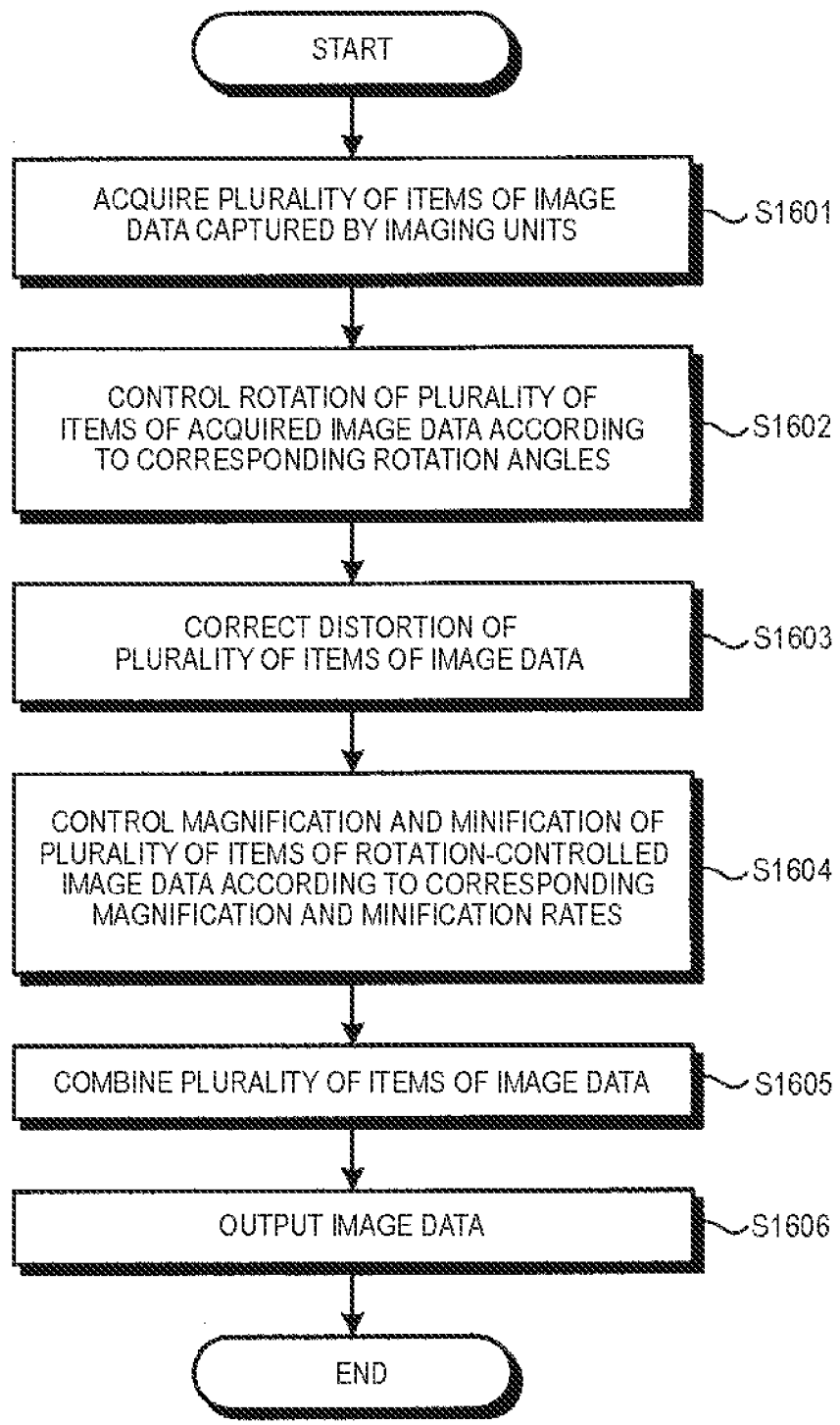

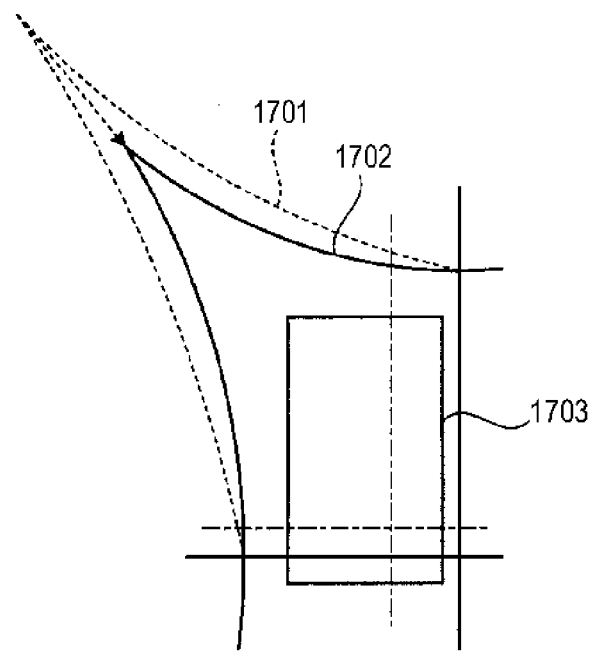
FIG.17A
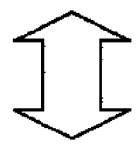
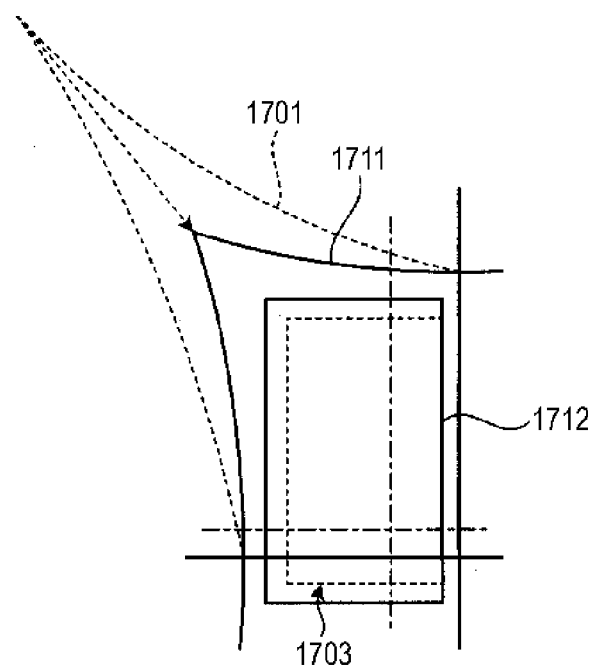
FIG.17B

PERIPHERY MONITORING APPARATUS AND PERIPHERY MONITORING SYSTEM

CROSS REFERENCE TO RELATED APPLICATIONS

This application is based on and claims priority under 35 U.S.C. § 119 to Japanese Patent Application 2014-197562, filed on Sep. 26, 2014, the entire contents of which are incorporated herein by reference.

TECHNICAL FIELD

Embodiments of this disclosure relate to a periphery monitoring apparatus and a periphery monitoring system.

BACKGROUND DISCUSSION

In the related art, as technology for assisting in parking a vehicle, there is disclosed technology for providing a driver with image data items of the periphery of the vehicle which are captured by a plurality of cameras installed in the vehicle. The cameras capture different peripheral images, and the different peripheral images are combined and displayed on a display that is provided around a driver's seat, and thus the driver can recognize surrounding circumstances.

A camera on a right side of a vehicle and a camera on a left side of the vehicle are not symmetrical in a lateral direction, and the attachment positions of the cameras are different, and thus when image data captured by the right-side camera and image data captured by the left-side camera are merely combined and displayed, a discrepancy between the image data items occurs. Therefore, technology is proposed to correct a discrepancy between image data items.

An example of the related art includes JP2003-95028A.

However, the difference between image data items associated with the difference between the attachment positions of cameras which are provided on door mirrors or the like affects not only directions included in the planes of the image data items, but also the magnification and minification rates of the image data items.

SUMMARY

Thus, a need exists for a periphery monitoring apparatus and a periphery monitoring system which are not suspectable to the drawback mentioned above.

In one example, a periphery monitoring apparatus according to an aspect of this disclosure includes: an acquisition unit configured to acquire first image data that is captured by a first imaging unit provided on a left side of a vehicle body, and second image data that is captured by a second imaging unit provided on a right side of the vehicle body; and an output unit configured to combine third image data which is generated by rotating, and magnifying or minifying the first image data in such a way that a plurality of first reference points included in the first image data are respectively displayed at pre-set first positions, and fourth image data which is generated by rotating, and magnifying or minifying the second image data in such a way that a plurality of second reference points included in the second image data are respectively displayed at pre-set second positions, and to output the combined image data.

In one example, a periphery monitoring system according to another aspect of this disclosure includes: a first imaging unit that is provided on a left side of a vehicle body and captures an image of the vicinity of the left side of the vehicle body; a second imaging unit that is provided on a right side of the vehicle body and captures an image of the vicinity of the right side of the vehicle body; an acquisition unit configured to acquire first image data captured by the first imaging unit, and second image data captured by the second imaging unit; and in which a display unit configured to combine third image data which is generated by rotating, and magnifying or minifying the first image data in such a way that a plurality of first reference points included in the first image data are respectively displayed at pre-set first positions, and fourth image data which is generated by rotating, and magnifying or minifying the second image data in such a way that a plurality of second reference points included in the second image data are respectively displayed at pre-set second positions, and to display the combined image data.

BRIEF DESCRIPTION OF THE DRAWINGS

The foregoing and additional features and characteristics of this disclosure will become more apparent from the following detailed description considered with the reference to the accompanying drawings, wherein:

FIG. 16 is a flowchart illustrating the sequence of a process that is performed by the periphery monitoring ECU in the first embodiment so as to display image data on the display device; and FIGS. 17A and 17B show diagrams illustrating the switching of image data to be displayed depending on travel situations of the vehicle in a second embodiment.

DETAILED DESCRIPTION

Hereinafter, exemplary embodiments of this disclosure will be presented. The configuration of each of the embodiments illustrated hereinafter, and operations and results (effects) caused by the configuration are merely examples. This disclosure can be realized by configurations other than the configurations disclosed in the embodiments, and various effects (also including secondary effects) can be obtained by a basic configuration.

In the embodiments to be described hereinafter, a vehicle 1 may be an automobile (internal combustion engine automobile) that uses an internal combustion engine (engine and not illustrated) as a drive source, an automobile (an electric automobile, a fuel-cell automobile, or the like) that uses an electric motor (motor and not illustrated) as a drive source, or an automobile (hybrid automobile) that uses both of an internal combustion engine and an electric motor as a drive source. Various transmissions can be mounted in the vehicle 1, and various apparatuses (systems, components, and the like) required to drive an internal combustion engine or an electric motor can be mounted in the vehicle 1. The type, the number, or the layout of apparatuses to drive wheels 3 of the vehicle 1 can be diversely set.

First Embodiment

Figure 1:
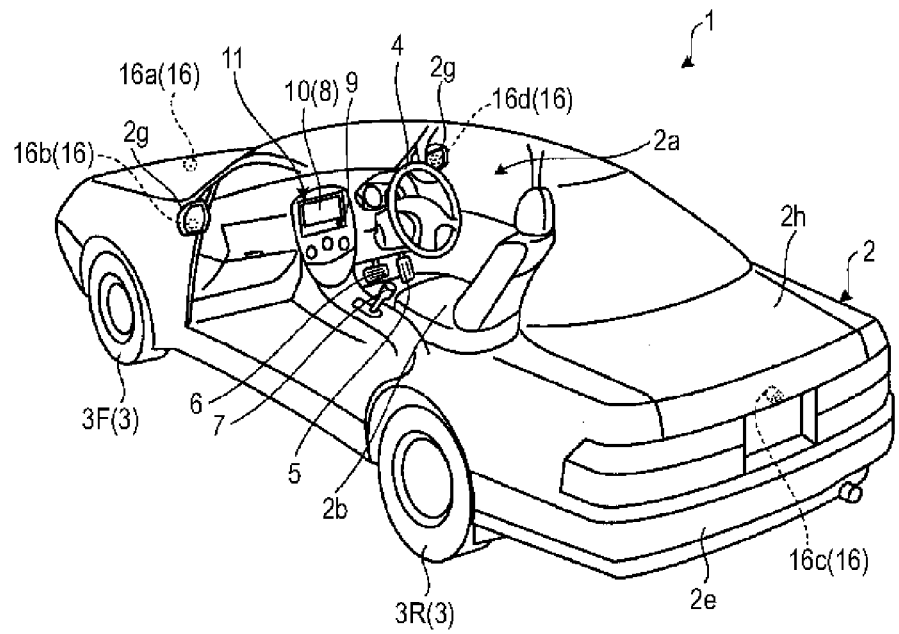
FIG. 1 is a perspective view illustrating an example of when a vehicle cabin of a vehicle is partially seen through in a first embodiment.

As illustrated in FIG. 1, in a first embodiment, a vehicle body 2 forms a vehicle cabin 2a which occupants (not illustrated) board. A steering unit 4, an acceleration unit 5, a brake unit 6, a transmission unit 7, and the like are provided in the vehicle cabin 2a while being proximate to a seat 2b of a driver that is an occupant. In the embodiment, for example, the steering unit 4 is a steering wheel that protrudes from the dashboard (instrument panel), the acceleration unit 5 is an accelerator pedal that is positioned below the foot of the driver, the brake unit 6 is a brake pedal that is positioned below the foot of the driver, and the transmission unit 7 is a shift lever that protrudes from a center console; however, these units are not limited to these components in the embodiment.

A display device (display output unit) 8 or a voice output device (voice output unit) 9 is provided in the vehicle cabin 2a. The display device 8 is a liquid crystal display (LCD), an organic electroluminescent display (OELD), or the like. The voice output device 9 is a speaker or the like. In the embodiment, for example, the display device 8 is covered with a transparent operation input unit (for example, a touch panel) 10. An occupant or the like can see a video (image) via the operation input unit 10, which is displayed on a display screen of the display device 8. An occupant or the like can input an operation (instruction) by touching, pressing, or moving a position on the operation input unit 10 with their finger while the position corresponds to the video (image) displayed on the display screen of the display device 8. In the embodiment, for example, the display device 8, the voice output device 9, the operation input unit 10, and the like are provided in a monitoring device 11 that is positioned in a center portion of the dashboard in the direction of width (lateral direction) of the vehicle. The monitoring device 11 can include operation input units (not illustrated) such as switches, dials, joysticks, push buttons. A voice output device (not illustrated) which is different from the voice output device 9 of the monitoring device 11 can be provided at a different position in the vehicle cabin 2a, or voices can be output from the other voice output device than the voice output device 9 of the monitoring device 11. In the embodiment, for example, the monitoring device 11 serves as a navigation system or an audio system; however, the monitoring device of the periphery monitoring apparatus may be provided independent of these navigation and audio systems. In addition to the voice output device 9, a voice output unit such as a buzzer can be configured to output alarm sounds or the like.

Figure 2:
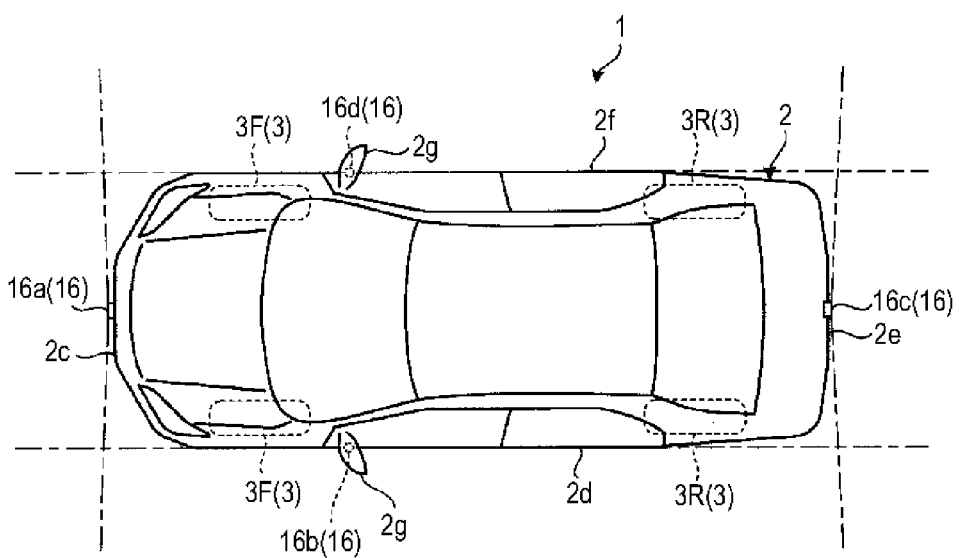
FIG. 2 is a plan view (bird's-eye view) illustrating an example of the vehicle in the first embodiment.

As illustrated in FIGS. 1 and 2, in the embodiment, for example, the vehicle 1 is a four-wheel vehicle (four-wheel automobile), and includes two right and left front wheels 3F and two right and left rear wheels 3R. For example, the tire angle of the front wheels 3F is changed (the front wheels 3F are turned) by the operation of the steering unit (steering wheel) 4. A steering system 12 is a motor-driven power steering system, a steer by wire (SBW) system, or the like. The steering system 12 supplements steering force, and turns the front wheels 3F by applying torque (assist torque) to the steering unit 4 using an actuator 12a. The steering system 12 may be configured to steer the front wheels and the rear wheels independently or in association with each other.

In the embodiment, for example, as illustrated in FIG. 2, a plurality (for example, four in the embodiment) of imaging units 16 (16a to 16d) are provided in the vehicle 1 (the vehicle body 2). Each of the imaging units 16 is a digital camera with a built-in imaging element such as a charge coupled device (CCD) or a CMOS image sensor (CIS). Each of the imaging units 16 can output image data (video data or frame data) at a predetermined frame rate. Each of the imaging units 16 includes a wide-angle lens, and, for example, can capture an image in a range (viewing angle) of 140° to 220° in a horizontal direction.

In the embodiment, for example, the imaging unit 16a is positioned in an end portion (end portion in a plan view) 2c on a front side (front side in a longitudinal direction of the vehicle) of the vehicle body 2, and is provided in a front grill or the like. The imaging unit 16b is positioned in an end portion 2d on a left side (left side in the direction of width of the vehicle) of the vehicle body 2, and is provided in a door mirror (protruding portion) 2g on the left side. The imaging unit 16c is positioned in an end portion 2e on a rear side (rear side in the longitudinal direction of the vehicle) of the vehicle body 2, and is provided in a lower wall portion of a rear trunk door 2h. The imaging unit 16d is positioned in an end portion 2f on a right side (right side in the direction of width of the vehicle) of the vehicle body 2, and is provided in another door mirror (protruding portion) 2g on the right side. Accordingly, for example, the display device 8 can simultaneously display a front view image acquired by the imaging unit 16a; a left view image captured by the imaging unit 16b; and a right view image captured by the imaging unit 16d. Similarly, the display device 8 can simultaneously display a rear view image acquired by the imaging unit 16c; a left view image captured by the imaging unit 16b; and a right view image captured by the imaging unit 16d. When a rear view image is displayed, the display of right and left view images may be omitted.

Figure 3:
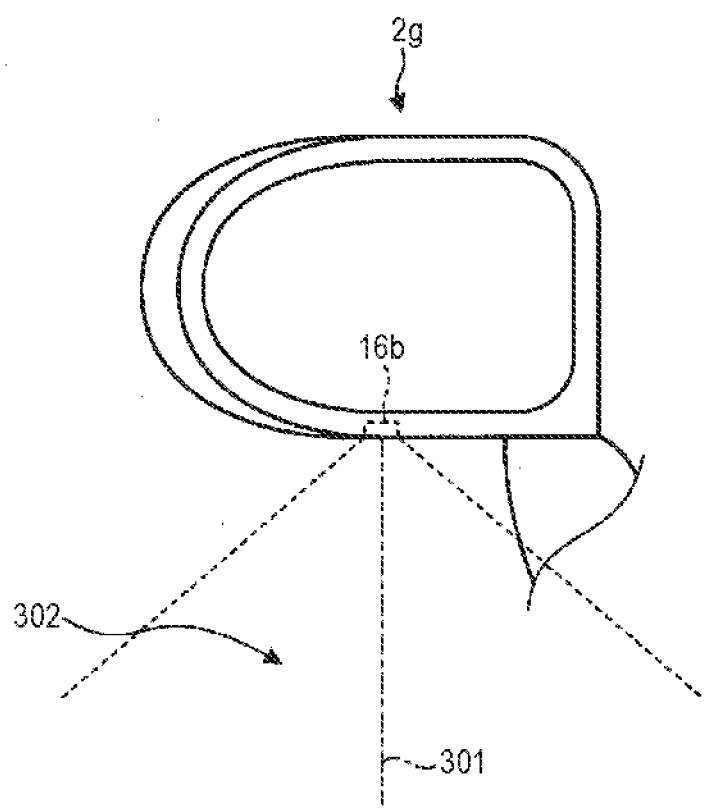
FIG. 3 is a view illustrating an example of the attachment position of an imaging unit in the first embodiment.

FIG. 3 is a view illustrating an example of the attachment position of the imaging unit 16b in the embodiment. As illustrated in FIG. 3, the imaging unit 16b is provided in a bottom portion of the left door mirror (protruding portion) 2g. As illustrated in FIG. 3, an optical axis 301 of the imaging unit 16b is set to face downwards (for example, in a vertical direction or diagonally downwards). The imaging unit 16b captures an image of an imaging region 302 that is defined by an angle of view of 140° to 220°. Accordingly, the imaging unit 16b captures an image of a road surface in the vicinity of a left side of the vehicle 1 with an image of a portion of the vehicle body 2 included. Substantially similar to the imaging unit 16b, the imaging unit 16d is provided in a bottom portion of the right door mirror (protruding portion) 2g, and captures an image of the road surface in the vicinity of a right side of the vehicle 1 with an image of a portion of the vehicle body 2 included, and therefore, an description thereof will be omitted.

Due to the difference between the right and left door mirrors, the imaging units 16b and 16d are not symmetrical in the lateral direction, and the installation positions of the imaging units 16b and 16d are different from each other. The difference between the installation positions also includes the difference between the respective heights of the imaging unit 16b of the left door mirror and the imaging unit 16d of the right door mirror from the road surface. Since the imaging unit 16 adopts a wide-angle lens, when the height of the imaging unit 16 from the road surface is slightly changed, the difference in imaging range or image depth occurs. In the embodiment, image data seen by a driver is adjusted to prevent the image data from being unnaturally seen.

Figure 4:
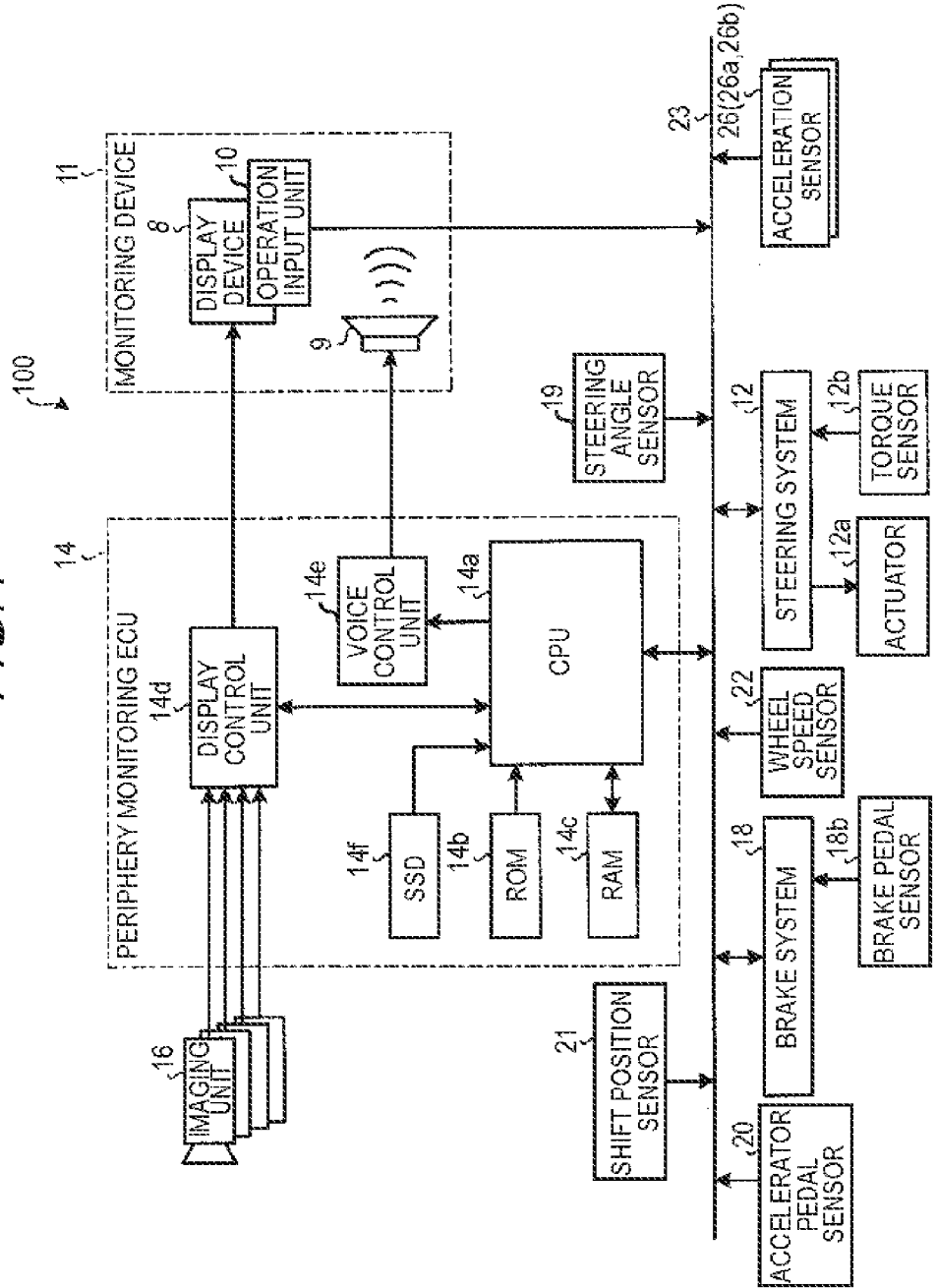
FIG. 4 is a block diagram illustrating an example of a periphery monitoring system of the vehicle in the first embodiment.

In the embodiment, for example, as illustrated in FIG. 4, in a periphery monitoring system (periphery monitoring apparatus) 100, in addition to a periphery monitoring electronic control unit (ECU) 14, the monitoring device 11, and the like, a brake system 18, a steering angle sensor (angle sensor) 19, an accelerator pedal sensor 20, a shift position sensor 21, a wheel speed sensor 22, an acceleration sensor 26, and the like are electrically connected to each other via an in-vehicle network (electric communication line) 23. For example, the in-vehicle network 23 is a controller area network (CAN). The periphery monitoring ECU 14 can control the brake system 18 and the like by transmitting control signals via the in-vehicle network 23. The periphery monitoring ECU 14 can receive, via the in-vehicle network 23, detection results from a torque sensor 12b, a brake pedal sensor 18b, the steering angle sensor (for the front wheels 3F) 19, the accelerator pedal sensor 20, the shift position sensor 21, the wheel speed sensor 22, the acceleration sensor 26, and the like, and instruction signals (control signals, operation signals, input signals, or data) from the operation input unit 10 and the like.

In the embodiment, two acceleration sensors 26 (26a and 26b) are provided in the vehicle 1. In the embodiment, the vehicle 1 is a vehicle with an electronic stability control (ESC) system mounted. Acceleration sensors which are already mounted in the vehicle with an ESC system mounted are used as the acceleration sensors 26 (26a and 26b). The embodiment is not limited to any specific type of the acceleration sensor, and insofar as the acceleration sensor can detect the acceleration of the vehicle 1 in the lateral direction, any type of the acceleration sensor may be used. In the embodiment, acceleration in the longitudinal direction and acceleration in the lateral direction are calculated.

For example, the periphery monitoring ECU 14 includes a central processing unit (CPU) 14a; a read only memory (ROM) 14b; a random access memory (RAM) 14c; a display control unit 14d; a voice control unit 14e; a solid state drive (SSD) (which is a flash memory) 14f; and the like. For example, the CPU 14a executes image processing for an image displayed on the display device 8, and various computational processes such as computing the travel path of the vehicle 1 and determining whether the vehicle 1 interferes with an object. The CPU 14a reads a program stored (installed) in a non-volatile storage device such as the ROM 14b, and executes computational processes according to the program.

The RAM 14c temporarily stores various data items which are used in computation performed by the CPU 14a. The display control unit 14d mainly executes imaging processing for image data obtained by the imaging unit 16, image processing (for example, image synthesis) for image data displayed on the display device 8, and the like among the computational processes performed by the periphery monitoring ECU 14. The voice control unit 14e mainly executes a process for voice data output from the voice output device 9 among the computational processes performed by the periphery monitoring ECU 14. The SSD 14f is a non-volatile rewritable storage unit, and even if the periphery monitoring ECU 14 is turned off, the SSD 14f can store data. The CPU 14a, the ROM 14b, and the RAM 14c can be integrated in the same package. The periphery monitoring ECU 14 may be configured to use another logic computational processor such as a digital signal processor (DSP), logic circuits, and the like instead of the CPU 14a. A hard disk drive (HDD) may be provided instead of the SSD 14f, and the SSD 14f or the HDD may be provided independently of the periphery monitoring ECU 14.

Figure 5:
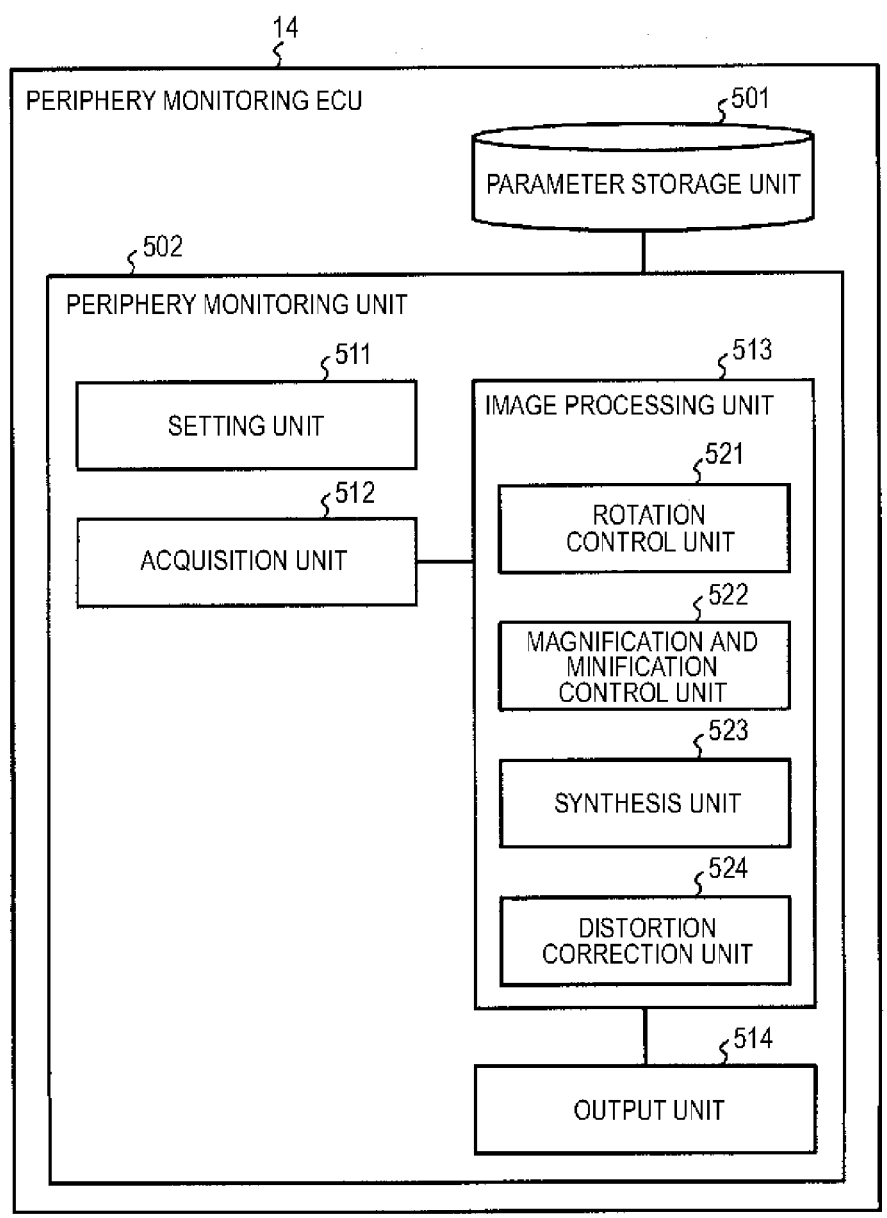
FIG. 5 is a block diagram illustrating the configuration of a periphery monitoring ECU in the first embodiment.

FIG. 5 is a block diagram illustrating the configuration of the periphery monitoring ECU 14 in the embodiment. As illustrated in FIG. 5, the periphery monitoring ECU 14 is configured to include a parameter storage unit 501 and a periphery monitoring unit 502. The CPU 14a of the periphery monitoring ECU 14 in FIG. 4 executes software stored in the ROM 14b such that each component of the periphery monitoring unit 502 is realized.

The periphery monitoring unit 502 realizes a setting unit 511, an acquisition unit 512, an image processing unit 513, and an output unit 514 by executing software stored in the ROM (computer-readable storage medium) 14b. The software (program) may be provided via another computer-readable storage medium.

The setting unit 511 sets parameters which are used in processing image data, and stores the parameters in the parameter storage unit 501 of the vehicle 1. Any type of technique of calculating parameters to be set may be used. For example, each of the imaging units 16b and 16d captures an image, and the setting unit 511 calculates positional information (including at least an angle) for the imaging units 16b and 16d based on the position of an object in the captured image data. The setting unit 511 stores parameter data, which is needed for image processing (for example, rotation control or magnification and minification control) and is based on the positional information (including at least an angle) for the imaging units 16b and 16d and the like, in the parameter storage unit 501. In the embodiment, the positional information for the imaging units 16b and 16d includes at least an angle; however, the positional information may include other items of information (for example, the height of the imaging units 16b and 16d from the road surface).

The parameter storage unit 501 stores the parameters calculated by the setting unit 511. As the stored parameters, the parameter storage unit 501 stores angular information required to rotate image data of the left side of the vehicle 1 captured by the imaging unit 16b based on the inclination of the imaging unit 16b provided in the left door mirror 2g, and angular information required to rotate image data of the right side of the vehicle 1 captured by the imaging unit 16d based on the inclination of the imaging unit 16d provided in the right door mirror 2g. In the embodiment, a rotation angle at which image data is rotated is stored as angular information; however, the inclination of each of the imaging units 16b and 16d required to calculate the rotation angle may be stored.

In addition, the parameter storage unit 501 stores range specifying information which is required to magnify or minify the captured image data of a left-side road surface and is based on a range (in other words, information calculated based on the height and the angle of view from the road surface) captured by the imaging unit 16b provided in the vehicle body 2, and range specifying information which is required to magnify or minify the captured image data of a right-side road surface and is based on a range (in other words, information calculated based on the height and the angle of view from the road surface) captured by the imaging unit 16d provided in the vehicle body. In the embodiment, the parameter storage unit 501 stores a magnification and minification rate for image data as the range specifying information on which the range of the image data to be displayed is specified; however, any type of information may be stored as the range specifying information insofar as the display range of image data to be displayed is specified based on that information, and for example, the range specifying information may be the height of each of the imaging units 16b and 16d from the road surface, the angle of view of each imaging unit, and the like.

The acquisition unit 512 acquires the image data items captured by the imaging units. The acquisition unit 512 acquires the image data captured by the imaging unit 16b provided on a left side of the vehicle body, and the image data captured by the imaging unit 16d provided on a right side of the vehicle body.

The image processing unit 513 includes a rotation control unit 521; a magnification and minification control unit 522; a distortion correction unit 524; and a synthesis unit 523. The image processing unit 513 performs image processing for the image data acquired by the acquisition unit 512, and generates image data to be displayed on the display device 8.

According to the angular information stored in the parameter storage unit 501, the rotation control unit 521 controls the rotation of the image data captured by the imaging unit 16b and the image data captured by the imaging unit 16d provided on the right side of the vehicle body 2.

The rotation angle in rotation control is achieved based on the angular information stored in the parameter storage unit 501. Hereinafter, the angular information stored in the parameter storage unit 501 will be described.

In the embodiment, angular information is set in such a way that imaginary reference points (hereinafter, which is referred to as rotation reference points) included in image data are displayed at proper positions.

Figure 6:
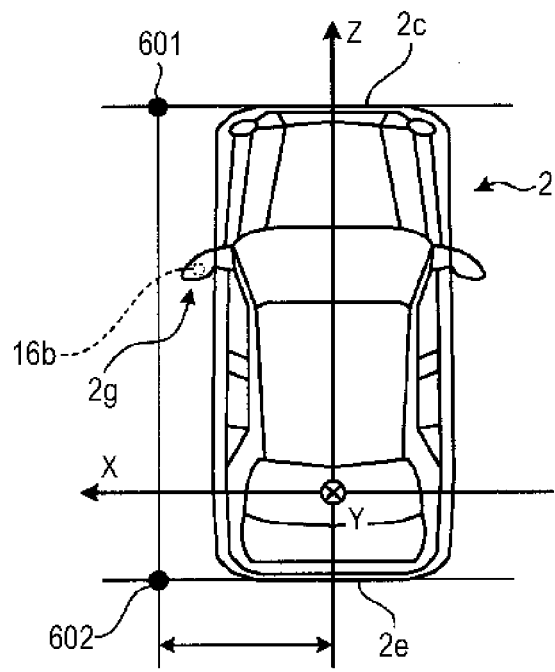
FIG. 6 is a view illustrating a positional relationship between imaginary rotation reference points and a vehicle so as to set angular information before the vehicle is shipped out of a factory.

FIG. 6 is a view illustrating a positional relationship between the imaginary rotation reference points and the vehicle 1 so as to set the angular information before the vehicle 1 is shipped out of a factory. In the example illustrated in FIG. 6, imaginary rotation reference points 601 and 602 are used as the positions of reference to obtain angular information for rotating the image data captured by the imaging unit 16b of the vehicle 1. A first imaginary rotation reference point 601 is positioned on an extension line toward the left side of the vehicle body 2 in the lateral direction from an end portion (end portion in a plan view) 2c on a front side (front side of the vehicle in the longitudinal direction) of the vehicle body 2, and the first imaginary rotation reference point 601 is positioned in the vicinity of the outside of the door mirror 2g. A second imaginary rotation reference point 602 is positioned on an extension line toward the left side of the vehicle body 2 in the lateral direction from an end portion (end portion in a plan view) 2e on a rear side (rear side of the vehicle in the longitudinal direction) of the vehicle body 2, and the second imaginary rotation reference point 602 is positioned in the vicinity of the outside of the door mirror 2g. The line connecting the first rotation reference point 601 and the second rotation reference point 602 is parallel to a z axis, and in other words, is parallel to an advance direction of the vehicle body 2.

Figure 7:
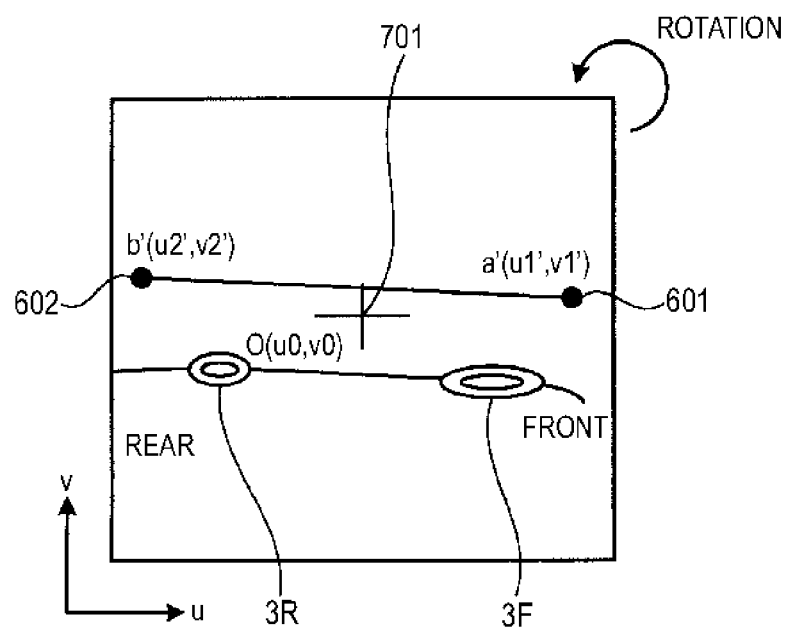
FIG. 7 is a diagram illustrating an example of the imaginary rotation reference points which are included in image data captured by the imaging unit of a left door mirror.

FIG. 7 is a diagram illustrating an example of the imaginary rotation reference points 601 and 602 which are included in the image data captured by the imaging unit 16b of the left door mirror 2g. The image data illustrated in FIG. 7 includes the rotation reference points 601 and 602 in addition to the front wheel 3F and the rear wheel 3R. A center position 701 of the image data illustrated in FIG. 7 is the intersection point between the optical axis of the imaging unit 16b and the road surface. The center position 701 has coordinates O (u0, v0).

In the example illustrated in FIG. 7, a u axis is oriented in a horizontal direction, and a v axis is oriented in a vertical direction. The first rotation reference point 601 is represented by coordinates a' (u1', v1'), and the second rotation reference point 602 is represented by coordinates b' (u2', v2') (the x coordinate u1' of the first rotation reference point 601 on the front wheel 3F side is greater than the x coordinate u2' of the second rotation reference point 602 on the rear wheel 3R side).

In the example illustrated in FIG. 7, it can be confirmed that the first rotation reference point 601 and the second rotation reference point 602 deviate from each other (are inclined) in the direction of the v axis. That is, when the image data illustrated in FIG. 7 is rotated by only $\pi/2$ in a direction of A, a deviation between an upward direction (direction of the v axis) of the image data and the advance direction of the vehicle 1 occurs. The inclination of a straight line a'b' is required to be corrected to prevent the occurrence of this deviation.

In the embodiment, the parameter storage unit 501 stores the angular information for correcting the inclination of the straight line a'b'. In other words, the rotation control unit 521 moves a plurality of the rotation reference points 601 and 602 included in the image data to positions at which the inclination is corrected by controlling the rotation of the image data based on the angular information (the line connecting the rotation reference points 601 and 602 is parallel to a vertical direction of the display device 8).

That is, when the rotation control unit 521 performs rotation control to display the image data on the display device 8, the rotation control unit 521 rotates the image data by $\pi/2$, and corrects the inclination of the line connecting the rotation reference points 601 and 602, based on the inclination of the imaging unit 16b. In other words, the rotation control unit 521 controls the rotation of the image data based on the angular information in such a way that the plurality of rotation reference points included in the image data are set at pre-set positions. In the embodiment, the positions of the rotation reference points 601 and 602 after being rotated are set in such a way that the line connecting the rotation reference points 601 and 602 is parallel to the axis of a display region of the display device 8 in an upward direction (in a height direction). In the embodiment, the line connecting the rotation reference points 601 and 602 is parallel to the vertical direction of the image data; however, the embodiment is not limited to parallelism therebetween, and for example, the line connecting the rotation reference points 601 and 602 may be substantially parallel to the vertical direction of the image data. Hereinafter, angular information will be described.

As described above, due to the inclination of the imaging unit 16b, the straight line a'b' is inclined relative to the u axis. An inclination 61 can be represented by Expression (1).

$$\delta 1 = \tan^{-1}(v1'-v2')/(u1'-u2') \quad (1)$$

Similarly, when an image is captured by the imaging unit 16d provided in the right door mirror 2g, due to the inclination of the imaging unit 16d, an inclination 62 of a straight line a"b" connecting the rotation reference points 601 and 602 can be represented by Expression (2). The rotation reference points positioned on the right side have coordinates a" (u1", v1") and coordinates b" (u2", v2"), respectively.

$$\delta 2 = \tan^{-1}(v1''-v2'')/(u1''-u2'') \quad (2)$$

When the image data items captured by the imaging units 16b and 16d are displayed on the display device 8, the rotation control unit 521 controls the rotation of the image data items while taking the aforementioned inclinations into consideration. In the embodiment, when the image data items are displayed on the display device 8, the rotation of the image data items captured by the imaging units 16b and 16d provided on the door mirrors 2g is controlled in such a way that the advance direction of the vehicle 1 is aligned with an upward direction of the display device 8. At this time, correction is performed based on the inclinations δ1 and δ2 of the imaging units 16b and 16d.

When the rotation control unit 521 controls the rotation of the image data captured by the imaging unit 16b provided on the left door mirror 2g, the rotation control unit 521 rotates the image data by a rotation angle of θ1 represented by Expression (3).

$$\theta 1 = -(\pi/2 + \delta 1) \quad (3)$$

Similarly, when the rotation control unit 521 controls the rotation of the image data captured by the imaging unit 16d provided on the right door mirror 2g, the rotation control unit 521 rotates the image data by a rotation angle of θ2 represented by Expression (4).

$$\theta 2 = (\pi/2 - \delta 2) \quad (4)$$

The control of rotation of each pixel included in image data is performed relative to the coordinates O (u0, v0) of the center position 701 as a reference position. Specifically, the rotation control unit 521 uses Expression (5) for the conversion of x coordinates, and Expression (6) for the conversion of y coordinates when rotating the pixels by a rotation angle of θ1. (u, v) is coordinates of each pixel before rotation control is performed, and (x, y) is coordinates of each pixel after the rotation control is performed. Expressions (5) and (6) are used to control the rotation of the image data captured by the imaging unit 16b of the left door mirror 2g, and similarly, the image data captured by the imaging unit 16d of the right door mirror 2g is controlled to be rotated by θ2 instead of θ1, and thus a description thereof will be omitted.

$$x = (u-u0) \times \cos \theta 1 - (v-v0) \times \sin \theta 1 \quad (5)$$

$$y = (u-u0) \times \sin \theta 1 + (v-v0) \times \cos \theta 1 \quad (6)$$

Figure 8:
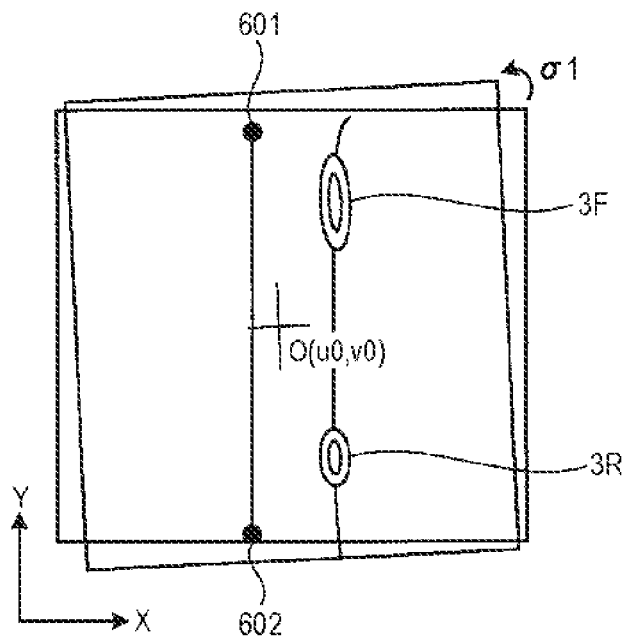
FIG. 8 is a diagram illustrating an example of rotation-controlled image data.

FIG. 8 is a diagram illustrating an example of rotation-controlled image data. As illustrated in FIG. 8, when the image data is rotated by π/2, and is further rotated by an angle of δ1, the line connecting the rotation reference points 601 and 602 becomes (substantially) parallel to a y axis (the vertical direction of the display device 8).

In the embodiment, the parameter storage unit 501 stores the rotation angles of θ1 and θ2 for performing rotation control as items of the angular information; however, any type of angular information may be stored insofar as the rotation control unit 521 can correct the inclinations of the imaging units 16b and 16d based on that angular information, and for example, the inclinations δ1 and δ2 of the straight lines a'b' and a"b" may be stored as items of the angular information.

In order to display image data (in other words, to magnify and minify image data) in a predetermined region of the display device 8, the magnification and minification control unit 522 controls the magnification and minification of the rotation-controlled image data, based on the range specifying information stored in the parameter storage unit 501. In the embodiment, the parameter storage unit 501 stores a magnification and minification rate for image data as the range specifying information. A technique of calculating a magnification and minfication rate will be described.

Figure 9:
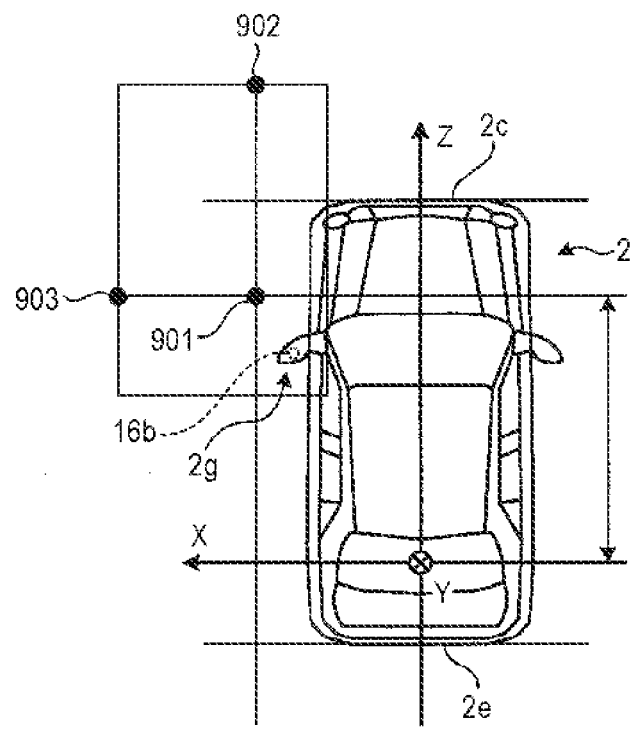
FIG. 9 is a view illustrating a positional relationship between imaginary magnification and minification reference points and the vehicle so as to set range specifying information before the vehicle is shipped out of the factory.

FIG. 9 is a view illustrating a positional relationship between imaginary magnification and minification reference points and the vehicle 1 so as to set the range specifying information before the vehicle 1 is shipped out of the factory. A first magnification and minification reference point 901 illustrated in FIG. 9 is positioned to serve as a reference point when image data is magnified and minified. A second magnification and minification reference point 902 illustrated in FIG. 9 is set to be at a position in the advance direction of the vehicle body 2 relative to the first imaginary magnification and minification reference point 901 as a reference point, with that position being present on the boundary of a range in which an occupant wishes to display image data on the display device 8. A third magnification and minification reference point 903 is set to be at a position in a direction perpendicular to the advance direction of the vehicle body 2 relative to the first imaginary magnification and minification reference point 901 as a reference point, with that position being present on the boundary of the range in which the occupant wishes to display the image data on the display device 8.

That is, the acquisition unit 512 acquires image data from the left imaging unit 16b, with the imaging range of the image data including the first imaginary magnification and minification reference point; the second magnification and minification reference point that is separated by a first distance from the first magnification and minification reference point in the advance direction of the vehicle body 2; and the third magnification and minification reference point that is separated by a second distance from the first magnification and minification reference point in the direction perpendicular to the advance direction of the vehicle body 2.

The setting unit 511 calculates a magnification and minification rate in such a way that the first magnification and minification reference point 901 in the captured image data is set to be at a predetermined position in the display region of the display device 8, and the second magnification and minification reference point 902 and the third magnification and minification reference point 903 in the image data are positioned on an outer (outermost) circumference of the display region of the display device 8.

Similarly, the acquisition unit 512 acquires image data from the right imaging unit 16d, with the imaging range of the image data including a fourth imaginary magnification and minification reference point; a fifth magnification and minification reference point that is separated by a third distance from the fourth magnification and minification reference point in the advance direction of the vehicle body 2; and a sixth magnification and minification reference point that is separated by a fourth distance from the fourth magnification and minification reference point in the direction perpendicular to the advance direction of the vehicle body 2. Similarly, the setting unit 511 calculates a magnification and minification rate in such a way that the fifth magnification and minification reference point and the sixth magnification and minification reference point in the image data are positioned on an outer (outermost) circumference of a display region of the display device 8.

In the embodiment, in addition to the processes of rotating, magnifying, and minifying image data, distortion induced by the wide-angle lens is also corrected.

Figure 10:
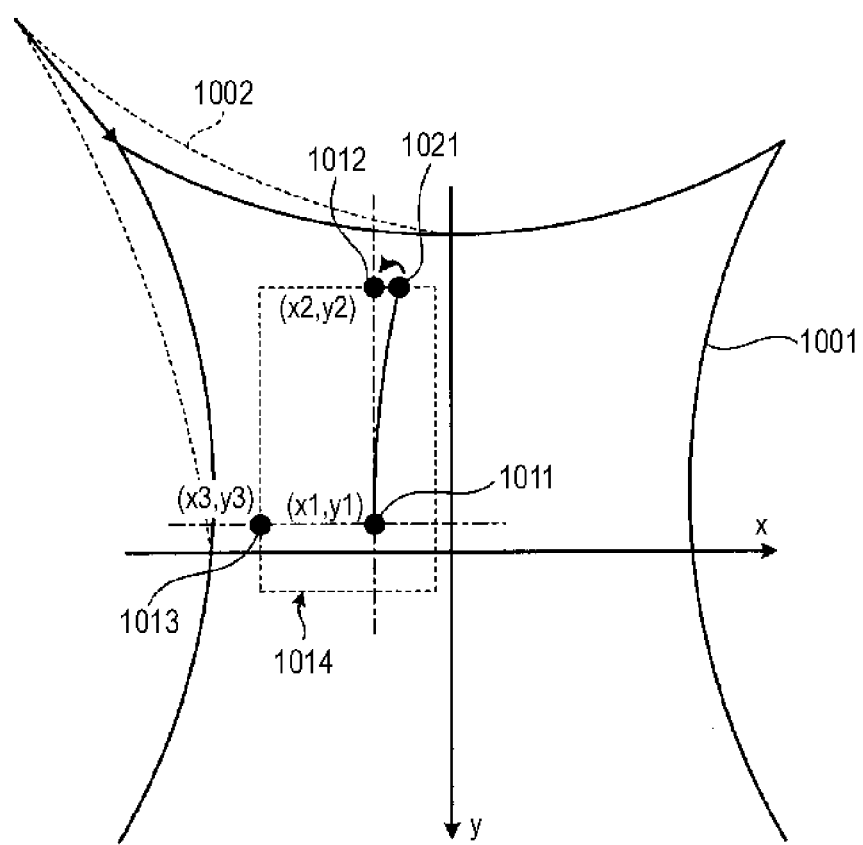
FIG. 10 is a diagram illustrating the magnification and minification reference points included in image data, and the distortion of the image data captured by the imaging unit.

FIG. 10 is a diagram illustrating the magnification and minification reference points included in image data, and the distortion of the image data captured by the imaging unit 16b.

A wide-angle lens with a small focal distance is mounted in each of the imaging units 16b and 16d so as to increase an imaging range. When an image of a range with a wide angle of view is captured, distortion of image data is increased corresponding to the wide angle of view.

In the embodiment, the distortion correction unit 524 corrects the distortion of the image data items captured by the imaging units 16b and 16d. FIG. 10 illustrates image data that is corrected for distortion by the distortion correction unit 524. After the distortion of the image data is corrected, a boundary line 1001 becomes the outermost circumference of the image data. However, when the distortion of the image data is completely corrected, a dotted line 1002 becomes the outermost circumference of the image data.

When the distortion of the image data is completely eliminated in this manner, visibility is improved, but the display range of the display device 8 is decreased. Accordingly, in the embodiment, the distortion correction unit 524 corrects the distortion of the image data in such a way that the distortion induced by the wide-angle lens remains un-eliminated to some extent. The second magnification and minification reference point is corrected from coordinates 1021 to coordinates 1012 due to the correction of distortion.

That is, when the distortion correction unit 524 corrects distortion induced by the wide-angle lens of each of the imaging units 16b and 16d, the distortion correction unit 524 performs a distortion correction process at a distortion correction rate which is set such that distortion in an outer circumferential region of each of the captured image data items remains un-eliminated to some extent so as to display a predetermined range of external environment of the vehicle body 2, and the image of the vicinity of the vehicle 2 is not substantially distorted. For example, the predetermined range of display of the display device 8 is set to include a distance of 5 m in the advance direction when the vehicle body 2 turns; however, the predetermined range of display is properly set according to embodiments.

As illustrated in FIG. 10, the setting unit 511 calculates a magnification and minification rate in such a way that coordinates (x1, y1) 1011 of the first magnification and minification reference point are displayed at a predetermined position on the display device 8, and the coordinates (x2, y2) 1012 of the second magnification and minification reference point and coordinates (x3, y3) 1013 of the third magnification and minification reference point are disposed on an outer circumference of a display region 1014. The parameter storage unit 501 stores the calculated magnification and minification rate point as range specifying information. The range specifying information is set in such a way that a plurality of the magnification and minification reference points including in the image data are displayed at the predetermined positions (outer circumference of the display region and the predetermined coordinates). The synthesis unit 523 trims the image data in such a way that a display region for the image data is exactly aligned with the display region 1014. The size of the display region to be trimmed may be pre-set.

The magnification and minification control unit 522 controls the magnification and minification of the image data according to the magnification and minification rate stored in the parameter storage unit 501. In other words, the magnification and minification control unit 522 controls the magnification and minification of the image data in such a way that the plurality of magnification and minification reference points included in the image data are displayed at the pre-set positions. Thereafter, the synthesis unit 523 trims away the magnified or minified image data in such a way that the range not included in the display region of the display device 8 is removed.

Figure 11:
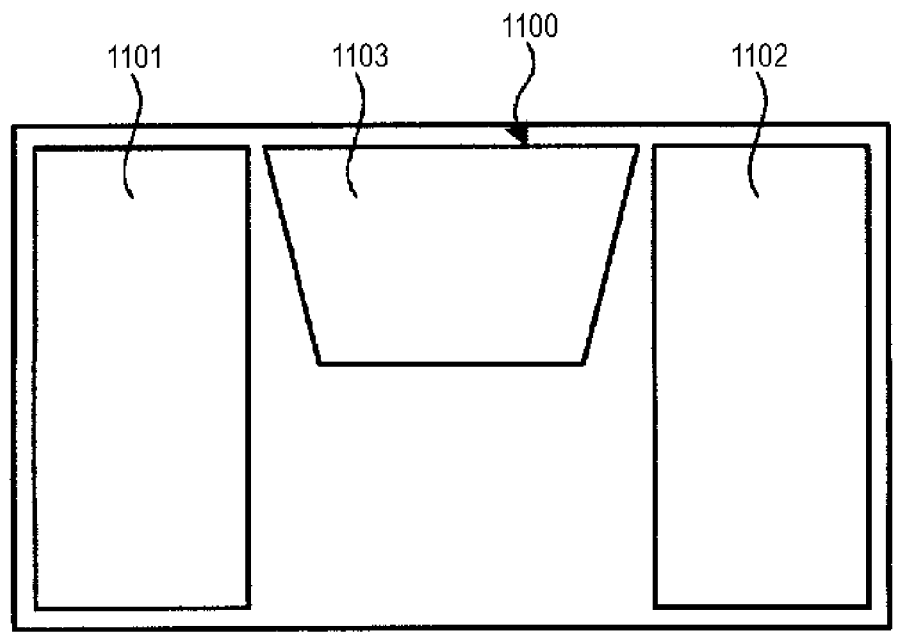
FIG. 11 is a diagram illustrating an example of a screen displayed on a display device in the first embodiment.

FIG. 11 is a diagram illustrating an example of a screen displayed on the display device 8 in the embodiment. In the example illustrated in FIG. 11, a plurality of items of image data captured by the imaging unit 16 are allocated to and are displayed in regions of a display region 1100. The image data, which is captured by the imaging unit 16b provided in the left door mirror 2g, is displayed in a display region 1101, and the image data, which is captured by the imaging unit 16d provided in the right door mirror 2g, is displayed in a display region 1102. The image data, which is captured by the imaging unit 16a provided in the end portion 2c on the front side of the vehicle body 2, is displayed in a display region 1103.

Figure 12:
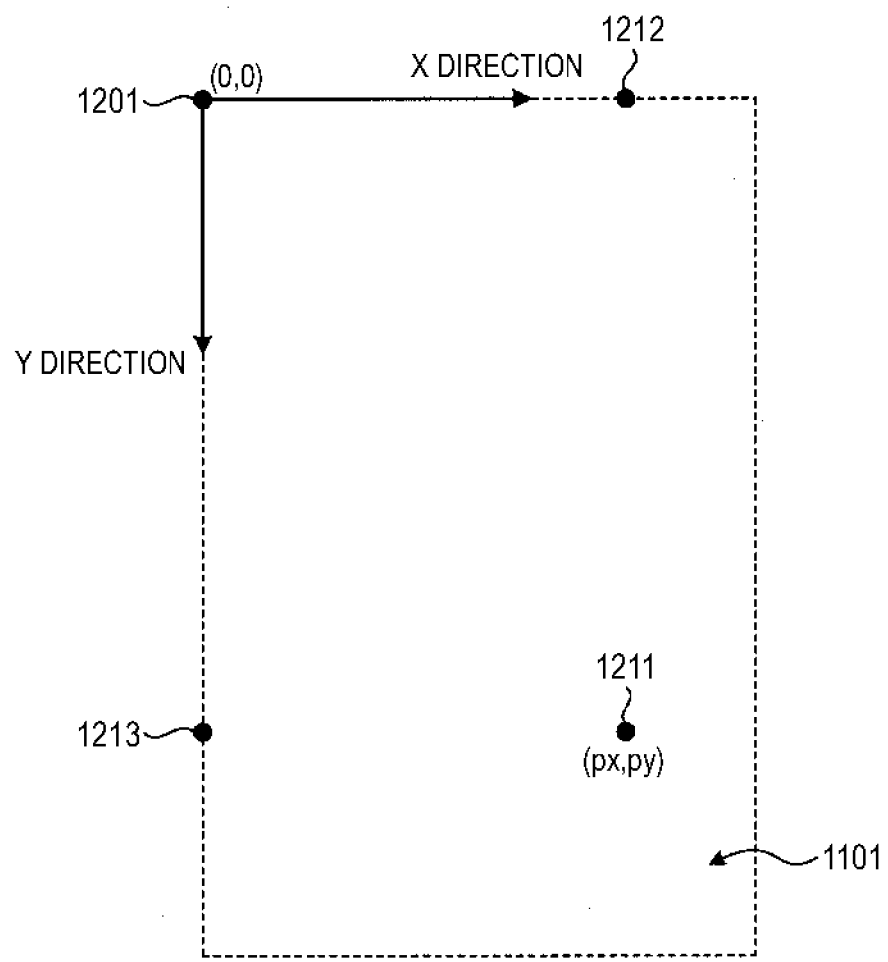
FIG. 12 is a diagram illustrating a positional relationship between the reference points of image data displayed in a display region of the display device in the first embodiment.

FIG. 12 is a diagram illustrating a positional relationship between the reference points of image data displayed in the display region 1101 of the display device 8 in the embodiment. As illustrated in FIG. 12, the image data captured by the imaging unit 16b is displayed in the display region 1101 of the display device 8, with coordinates 1201 being set as the origin. As illustrated in FIG. 12, the setting unit 511 sets a magnification and minification rate in such a way that the first magnification and minification reference point is displayed at coordinates (px, py) 1211, the second magnification and minification reference point is displayed at coordinates 1212, and the third magnification and minification reference point is displayed at coordinates 1213.

A description to be given hereinafter relates to a technique by which the setting unit 511 calculates the magnification and minification rate of image data in such a way that the image data is displayed on the display device 8.

In the embodiment, a magnification and minification rate in a vertical direction (in a Y-direction), and a magnification and minification rate in a horizontal direction (in an X-direction) are separately calculated. The setting unit 511 calculates a magnification and minification rate Scale Y in the vertical direction (in the Y-direction) using Expression (7). In the image data illustrated in FIG. 10, the first magnification and minification reference point is represented by the coordinates (x1, y1) 1011, and the second magnification and minification reference point is represented by the coordinates (x2, y2) 1012.

Scale $Y=py/$(the distance between the first magnification and minification reference point and the second magnification and minification reference point in the $Y$-direction)$=py/|y1-y2|$ (7)

Subsequently, the setting unit 511 calculates a magnification and minification rate Scale X in the horizontal direction (in the X-direction) using Expression (8). In the image data illustrated in FIG. 10, the first magnification and minification reference point is represented by the coordinates (x1, y1) 1011, and the third magnification and minification reference point is represented by the coordinates (x3, y3) 1013.

Scale $X=px/$(the distance between the first magnification and minification reference point and the third magnification and minification reference point in the $X$-direction)$=px/|x1-x3|$ (8)

The magnification and minification control unit 522 performs magnification and minification control and moves the reference coordinates based on the magnification and minification rate Scale Y in the Y-direction and the magnification and minification rate Scale X in the X-direction.

Expression (9) is used in the conversion of the x coordinates of the image data associated with the magnification and minification control and the movement of the reference coordinates, and Expression (10) is used in the conversion of the y coordinates of the image data associated therewith. The coordinates of an arbitrary pixel included in the image data are (x, y) before being converted, and (x', y') after being converted.

$$x'=(x-x1) \times \text{Scale } X-(-px) \quad (9)$$

$$y'=(y-y1) \times \text{Scale } Y-(-py) \quad (10)$$

Each of pixels included in the image data is converted using Expressions (9) and (10), and thus image data to be displayed on the display device 8 is generated.

In the embodiment, the image data that is captured by the imaging unit 16a provided in the end portion 2c on the front side of the vehicle body 2 is magnified and minified, and is trimmed so as to display the image in the display region 1103 of the display device 8, which is not described.

The synthesis unit 523 generates image data to be displayed on the display device 8 by synthesizing the image data items and the like processed by the magnification and minification control unit 522.

Figure 13:
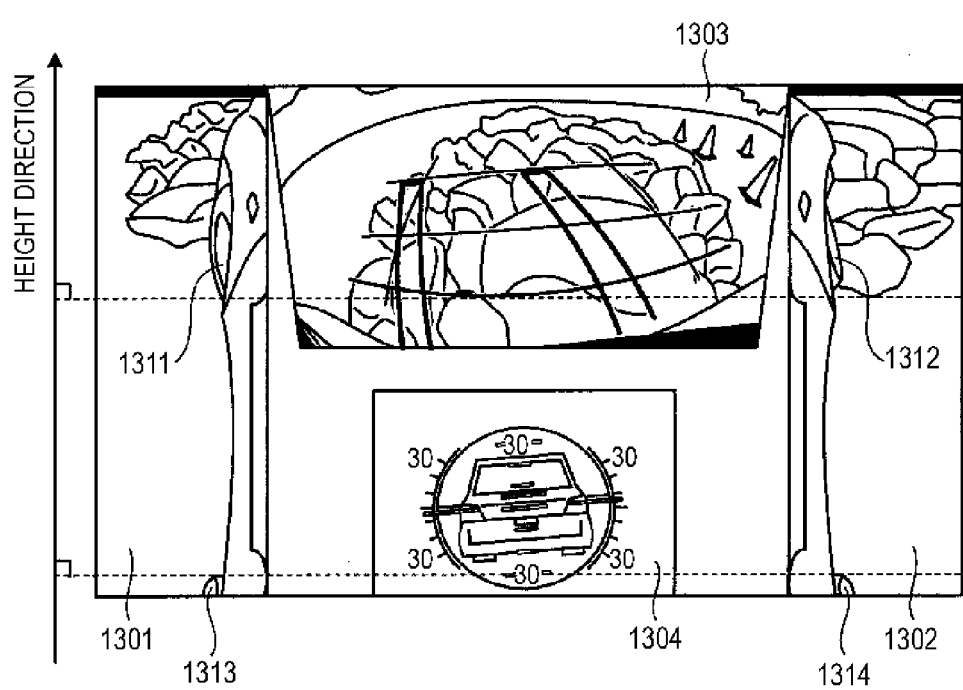
FIG. 13 is a diagram illustrating image data synthesized by a synthesis unit of the periphery monitoring ECU in the first embodiment.

FIG. 13 is a diagram illustrating the image data synthesized by the synthesis unit 523. As illustrated in FIG. 13, a region 1301 included in the synthesized image data displays a result that is generated by rotating, correcting the distortion of, and magnifying and minifying the image data captured by the imaging unit 16b provided in the left door mirror 2g. In addition, a region 1302 displays a result that is generated by rotating, and magnifying and minifying the image data captured by the imaging unit 16d provided in the right door mirror 2g. In addition, a region 1303 displays a result that is generated by processing the image data captured by the imaging unit 16a provided in the end portion 2c on the front side of the vehicle body 2. A region 1304 displays information regarding the inclination of the vehicle body 2 and the like.

In the display device 8 in the embodiment, the image data displayed in the region 1301 and the image data displayed in the region 1302 represent the results which are generated by rotating, correcting the distortion of, and magnifying and minifying the image data items according to the imaging units 16b and 16d.

In the embodiment, the acquisition unit 512 acquires first image data and second image data. The first image data is image data captured by the imaging unit 16b provided on the left side of the vehicle body 2, and the imaging range of the first image data includes a left front wheel and a left rear wheel that is positioned differently from the left front wheel in the advance direction of the vehicle body 2. The second image data is image data captured by the imaging unit 16d, and the imaging range of the second image data includes a right front wheel and a right rear wheel that is positioned differently from the right front wheel in the advance direction of the vehicle body 2.

In the embodiment, the periphery monitoring ECU 14 performs a process of rotating, correcting the distortion of, magnifying and minifying, and trimming the image data captured by the imaging unit 16b and the image data captured by the imaging unit 16d according to the conditions of each of the image data items. Accordingly, the image data output from the output unit 514, a left front wheel 1311 displayed in the region 1301 and a right front wheel 1312 displayed in the region 1302 have substantially the same coordinate value (vicinity coordinates) in the axis of the display device 8 in the height (upward) direction that corresponds to the advance direction of the vehicle body 2. In addition, the image data output from the output unit 514, a left rear wheel 1313 displayed in the region 1301 and a right rear wheel 1314 displayed in the region 1302 have substantially the same coordinate value (vicinity coordinates) in the axis of the display device 8 in the height (upward) direction that corresponds to the advance direction of the vehicle body 2.

That is, in the related art, when the left imaging unit and the right imaging unit 16d are not symmetrical in the lateral direction, and the positions of the left imaging unit and the right imaging unit 16d are different from each other in a height direction of the vehicle body 2, even if the left front wheel and the right front wheel are adjusted to have the same coordinates in the height (upward) direction, it is not easy to adjust the coordinates of the left rear wheel and the right rear wheel to be the same coordinates in the height (upward) direction. In contrast, in the embodiment, each of the image data items captured by the imaging units 16b and 16d is rotated, corrected for distortion, and magnified and minified according to the conditions of each of the image data items, and thus a plurality of positions can be aligned with each other in the height (upward) direction.

In the example illustrated in FIG. 13, the output unit 514 outputs image data in which the positions of a rear end portion of the left front wheel, a rear end portion of the right front wheel, a front end portion of the left rear wheel, and a front end portion of the right rear wheel are used as reference positions, and these reference positions are adjusted to have the same coordinate value. However, the reference positions are not limited to the example illustrated in FIG. 13, and for example, the positions of front end portions of both the front wheels and the rear wheels may be used as reference positions, or the positions of rear end portions of both the front wheels and the rear wheels may be used as the reference positions. In addition, the positions of the centers of the front wheel and the rear wheel, in other words, the positions of the axles of the front wheel and the rear wheel may be used as the reference positions, and may be adjusted to have the same coordinates. In addition, the reference positions are not limited to positions related to the wheels, and positions related to the doors, winkers, or the like of the vehicle body 2 may be used as the reference positions. The positions of a front end portion and a rear end portion of the vehicle body 2 may be used as the reference positions, and may be adjusted to have the same coordinates.

In the embodiment, the region of display of the vehicle body 2 is not limited to the example illustrated in FIG. 13. In the example illustrated in FIG. 13, the display device 8 displays the image data which is trimmed so as to include the front end portion of the vehicle body 2 and the front end portions of the rear wheels. However, the display region is not limited to that in the embodiment, and the display device 8 may display image data that is trimmed to include the front end portion and the rear end portion of the vehicle body 2. In this case, the positions of the wheels may be used as reference positions, or the positions of the front end portion and the rear end portion of the vehicle body 2 may be used as reference positions.

Figure 14:
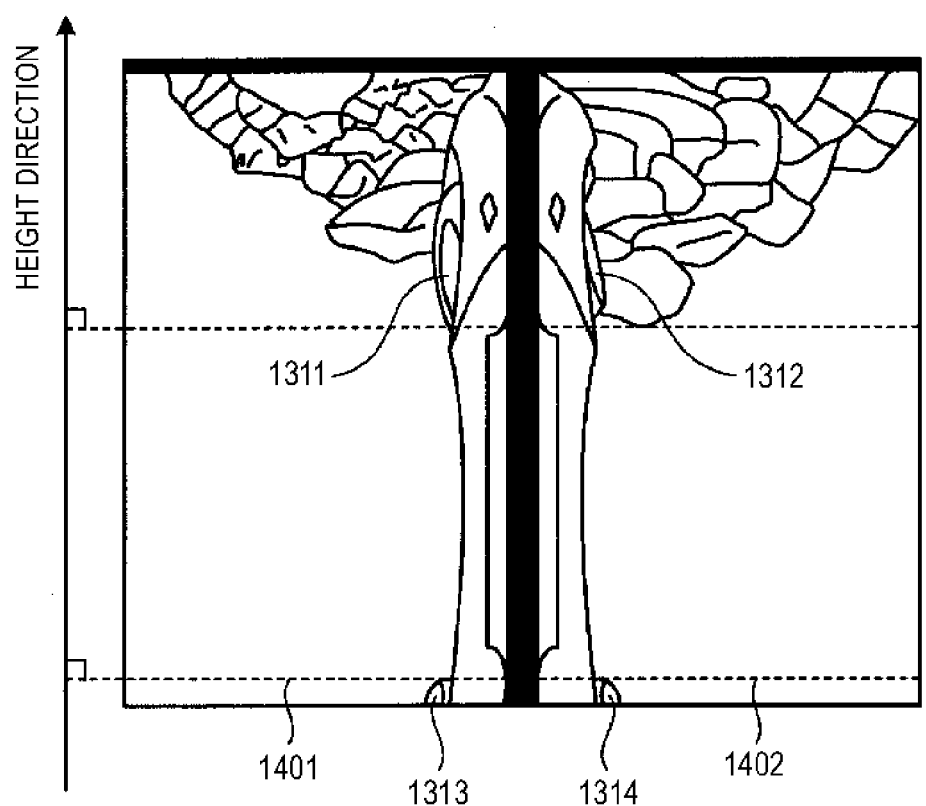
FIG. 14 is a diagram illustrating image data synthesized by the synthesis unit of the periphery monitoring ECU in a modification example.

In the embodiment, a combination of image data and various items of information are displayed; however, a display mode is not limited to that in the embodiment. For example, the display device 8 may display a combination of only the result of rotating, and magnifying or minifying the image data captured by the imaging unit 16*b* provided in the left door mirror 2*g*, and the result of rotating, and magnifying or minifying the image data captured by the imaging unit 16*d* provided in the right door mirror 2*g*. FIG. 14 is a diagram illustrating image data synthesized by the synthesis unit 523 in a modification example.

Also in the example illustrated in FIG. 14, in regions 1401 and 1402, the left front wheel 1311 and the right front wheel 1312 are displayed at substantially the same coordinate value (vicinity coordinates) in the axis of the display device 8 in the height (upward) direction, and the left rear wheel 1313 and the right rear wheel 1314 are displayed at substantially the same coordinate value (vicinity coordinates) in the axis of the display device 8 in the height (upward) direction. Accordingly, a driver can be prevented from considering a screen displayed on the display device 8 as being unnatural, and thus it is possible to improve the ease of use.

Referring to the embodiment, image data items are captured by the plurality of imaging units 16, the image data items are rotated, and magnified or minified, the synthesis unit 523 synthesizes the image data items, and then the output unit 514 outputs the synthesized image data.

In other words, the imaged data items are rotated, and magnified or minified in such a way that a plurality of reference points included in the image data items are respectively displayed at pre-set positions, and the output unit 514 outputs image data that is generated by combining the plurality of items of image data generated in this manner.

Figure 15:
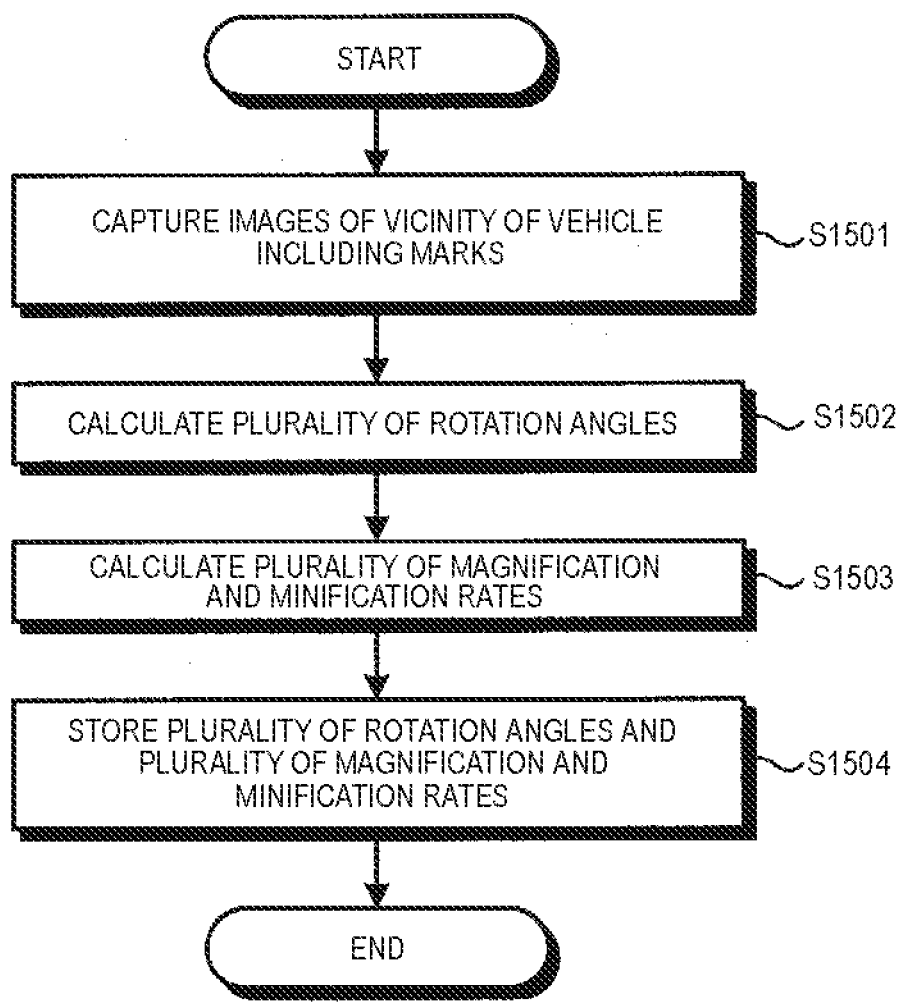
FIG. 15 is a flowchart illustrating the sequence of a process that is performed by the periphery monitoring ECU before the vehicle is shipped out of the factory in the first embodiment.

Hereinafter, a process, which is performed by the periphery monitoring ECU 14 in the embodiment before the vehicle 1 is shipped out of the factory, will be described. FIG. 15 is a flowchart illustrating the sequence of this process performed by the periphery monitoring ECU 14 in the embodiment.

First, the imaging units 16 of the vehicle 1 capture images of the vicinity of the vehicle 1 (step S1501). The acquisition unit 512 acquires the image data items captured by the imaging units 16. The vicinity may include marks or the like which can serve as reference points to specify the inclinations or the positions of the imaging units 16.

The setting unit 511 calculates the inclinations of the imaging units 16*b* and 16*d* based on the captured image data items, and then calculates a plurality of rotation angles corresponding to the image data items captured by the imaging units 16*b* and 16*d*, based on the inclinations of the imaging units 16*b* and 16*d* (step S1502). The plurality of rotation angles are a rotation angle for rotating the image data captured by the imaging unit 16*b*, and a rotation angle for rotating the image data captured by the imaging unit 16*d*.

In addition, the setting unit 511 calculates a plurality of magnification and minification rates for displaying the image data items captured by the imaging units 16*b* and 16*d* in a proper display region of the display device 8, based on reference points included in the captured image data items (step S1503). The plurality of magnification and minification rates are a magnification and minification rate for magnifying or minifying the image data captured by the imaging unit 16*b*, and a magnification and minification rate for magnifying or minifying the image data captured by the imaging unit 16*d*.

The parameter storage unit 501 stores the plurality of rotation angles (in other words, angular information) and the plurality of magnification and minification rates (in other words, range specifying information) which are calculated by the setting unit 511 (step S1504).

Since these parameters are not changed even after the vehicle 1 is shipped out of the factory, these parameters can be used in image processing to be described later. In the embodiment, the parameter storage unit 501 stores the rotation angles for rotating the image data items; however, the parameter storage unit 501 may store any type of information insofar as the information can be used to calculate the rotation angles for rotating the image data items, and for example, the parameter storage unit 501 may store positional information regarding the imaging units 16*b* and 16*d*, or the like.

Hereinafter, a process, which is performed by the periphery monitoring ECU 14 in the embodiment so as to display image data on the display device 8, will be described. FIG. 16 is a flowchart illustrating the sequence of this process performed by the periphery monitoring ECU 14 in the embodiment.

First, the acquisition unit 512 acquires image data items captured by the imaging units 16 (step S1601).

Subsequently, according to the corresponding rotation angles stored in the parameter storage unit 501, the rotation control unit 521 controls the rotation of a plurality of items of the image data, which are captured by the imaging units 16*b* and 16*d*, among the acquired image data items (step S1602).

The distortion correction unit 524 corrects the distortion of the plurality of items of rotation-controlled image data at distortion correction rates which are respectively set for the imaging units (step S1603).

Thereafter, according to the corresponding magnification and minification rates stored in the parameter storage unit 501, the magnification and minification control unit 522 controls the magnification and minification of the plurality of items of rotation-controlled image data (step S1604).

The synthesis unit 523 performs trimming in such a way that the plurality of items of rotation-controlled, and magnified and minified image data are displayed in pre-set regions, and then generates image data to be displayed on the display device 8 by combining the plurality of items of image data (step S1605).

Subsequently, the output unit 514 outputs the image data, into which the plurality of items of image data are combined by the synthesis unit 523, to the display device 8 (step S1606).

Following the sequence of the process, the display device 8 can display the plurality of items of image data which are captured by the plurality of imaging units 16*b* and 16*d* provided in the door mirrors 2g, without a deviation between the plurality of items of image data displayed on the right and left sides.

In the embodiment, the plurality of items of image data captured by the imaging units 16b and 16d provided in the door mirrors 2g are controlled to be rotated at the corresponding rotation angles, and are controlled to be magnified and minified at the corresponding magnification and minification rates, and then the plurality of items of image data are combined together. Therefore, it is possible to prevent the occurrence of a deviation between the ranges and the positions of the image data items to be displayed on the display device 8. Accordingly, it is possible to prevent the displayed image data items from being unnaturally seen, and a driver can easily understand the vicinity environment of the vehicle 1. When the driver watches the display device 8 for their reference, it is possible to improve the visibility of the driver by preventing the occurrence of a deviation between the displayed image data items. As a result, it is possible to reduce burden in driving the vehicle 1.

Second Embodiment

In the first embodiment, even if the vehicle 1 travels, the imaging units 16b and 16d are corrected at the pre-set distortion correction rates. However, there is assumed to be a situation in which the driver wishes to display image data in a wider range even if the image data is distorted to some extent. An example of this situation is a case in which the vehicle 1 travels off a road, and since the field of vision is not good in this case compared to when the vehicle 1 travels on the road, the display device 8 is required to display image data in a wider range. In an example illustrated in a second embodiment, a display range of the display device 8 is switched depending on situations. In the embodiment, the same components as in the first embodiment will be not described.

FIGS. 17A and 17B are views illustrating a case in which the switching of displayed image data is made depending on travel situations of the vehicle 1. In the example illustrated in FIGS. 17A and 17B, FIG. 17A illustrates image data that is generated when the vehicle 1 travels in an on-road mode, and FIG. 17B illustrates image data that is generated when the vehicle 1 travels in an off-road mode.

A dotted line 1701 represents an outer circumference when the distortion of the image data is completely corrected while the vehicle 1 travels in the on-road mode shown in FIG. 17A. In the embodiment, when the distortion correction unit 524 corrects the distortion of the image data in the on-road mode, a boundary line 1702 becomes the outermost circumference of the image data. A region 1703 in the image data bounded by the boundary line 1702 represents a range to be displayed on the display device 8.

The dotted line 1701 represents the outer circumference when the distortion of the image data is completely corrected while the vehicle 1 travels in the off-road mode shown in FIG. 17B. In the embodiment, when the distortion correction unit 524 corrects the distortion of the image data in the off-road mode, a boundary line 1711 becomes the outermost circumference of the image data. As such, a distortion correction rate in the off-road mode shown in FIG. 17B is set to be smaller than that in the on-road mode shown in FIG. 17A. A region 1712 in the image data bounded by the boundary line 1711 represents a range to be displayed on the display device 8. The region 1712 in FIG. 17B is set to be wider than the region 1703 in FIG. 17A. In the off-road mode, the distortion correction rate is small and the display range is wide compared to the on-road mode, and thus a wide range of image data with a large distortion is displayed on the display device 8.

Accordingly, when the driver watches the display device 8 for their reference, the driver can recognize a wider range of situations in the off-road mode shown in FIG. 17B. Switching between the on-road mode and the off-road mode may be made according to an operation by the driver, or may be automatically made.

That is, in the on-road mode, it is possible to improve the visibility of the driver by displaying a narrow range of image data with a small distortion, and in the off-road mode, it is possible to recognize a wider range of situations by displaying a wide range of image data with a large distortion. As such, since image data is displayed depending on situations, it is possible to reduce burden when steering the vehicle 1.

In one example, a periphery monitoring apparatus according to an aspect of this disclosure includes: an acquisition unit configured to acquire first image data that is captured by a first imaging unit provided on a left side of a vehicle body, and second image data that is captured by a second imaging unit provided on a right side of the vehicle body; and an output unit configured to combine third image data which is generated by rotating, and magnifying or minifying the first image data in such a way that a plurality of first reference points included in the first image data are respectively displayed at pre-set first positions, and fourth image data which is generated by rotating, and magnifying or minifying the second image data in such a way that a plurality of second reference points included in the second image data are respectively displayed at pre-set second positions, and to output the combined image data. Accordingly, for example, a deviation between the displayed image data items does not occur, and thus it is possible to improve visibility, and to reduce burden in driving the vehicle.

In one example, the periphery monitoring apparatus according to the aspect of this disclosure may further include a storage unit configured to store first angular information for rotating the first image data based on the inclination of the first imaging unit provided on the left side of the vehicle body, and second angular information for rotating the second image data based on the inclination of the second imaging unit provided on the right side of the vehicle body. The output unit may combine the third image data that is generated by rotating, and magnifying or minifying the first image data according to the first angular information, and the fourth image data that is generated by rotating, and magnifying or minifying the second image data according to the second angular information, and output the combined image data. Accordingly, for example, it is possible to prevent the occurrence of a deviation between the displayed image data items by performing rotation control according to the angular information stored in the storage unit. As a result, it is possible to improve visibility, and to reduce burden in driving the vehicle.

In one example, the periphery monitoring apparatus according to the aspect of this disclosure may further include a storage unit configured to store first range specifying information for magnifying or minifying the first image data based on positional information regarding the first imaging unit provided in the vehicle body, and second range specifying information for magnifying or minifying the second image data based on positional information regarding the second imaging unit provided in the vehicle body. The output unit may combine the third image data that is generated by rotating the first image data, and magnifying or minifying the first image data according to the first range specifying information, and the fourth image data that is generated by rotating the second image data, and magnifying or minifying the second image data according to the second range specifying information, and output the combined image data. Accordingly, for example, it is possible to prevent the occurrence of a deviation between the displayed image data items by performing magnification or minification control according to the range specifying information stored in the storage unit. As a result, it is possible to improve visibility, and to reduce burden in driving the vehicle.

In one example, in the periphery monitoring apparatus according to the aspect of this disclosure, the acquisition unit may acquire the first image data, the imaging range of which includes a first reference point, a second reference point that is separated from the first reference point in an advance direction of the vehicle body, and a third reference point that is separated from the first reference point in a direction perpendicular to the advance direction of the vehicle body as a plurality of left reference points, and the second image data, the imaging range of which includes a fourth reference point, a fifth reference point that is separated from the fourth reference point in the advance direction of the vehicle body, and a sixth reference point that is separated from the fourth reference point in the direction perpendicular to the advance direction of the vehicle body as a plurality of right reference points. Since it is possible to magnify or minify the image data items using the first to sixth reference points as reference points, the image data items can be properly displayed in a range. As a result, it is possible to improve visibility, and to reduce burden in driving the vehicle.

In one example, in the periphery monitoring apparatus according to the aspect of this disclosure, when distortion induced by a wide-angle lens of each of the first imaging unit and the second imaging unit is corrected, the output unit may output the third image data and the fourth image data generated by performing a distortion correction process at a distortion correction rate which is set such that distortion in an outer circumferential region of each of the first image data and the second image data remains un-eliminated to some extent so as to display a predetermined range of external environment of the vehicle body. Since it is possible to display a wide range of external environments by performing the distortion correction process at the aforementioned distorsion correction rates, it is possible to improve visibility, and to reduce burden in driving the vehicle.

In one example, a periphery monitoring system according to another aspect of this disclosure includes: a first imaging unit that is provided on a left side of a vehicle body and captures an image of the vicinity of the left side of the vehicle body; a second imaging unit that is provided on a right side of the vehicle body and captures an image of the vicinity of the right side of the vehicle body; an acquisition unit configured to acquire first image data captured by the first imaging unit, and second image data captured by the second imaging unit; and in which a display unit configured to combine third image data which is generated by rotating, and magnifying or minifying the first image data in such a way that a plurality of first reference points included in the first image data are respectively displayed at pre-set first positions, and fourth image data which is generated by rotating, and magnifying or minifying the second image data in such a way that a plurality of second reference points included in the second image data are respectively displayed at pre-set second positions, and to display the combined image data. Accordingly, for example, a deviation between the displayed image data items does not occur, and thus it is possible to improve visibility, and to reduce burden in driving the vehicle.

Hereinafter, supplementary notes related to the aforementioned embodiments are disclosed.

Supplementary Note 1

A periphery monitoring apparatus includes an acquisition unit configured to acquire first image data which is captured by a first imaging unit provided on a left side of a vehicle body, and the imaging range of which includes a first reference position and a second reference position that is positioned differently from the first reference position in an advance direction of the vehicle body, and to acquire second image data which is captured by a second imaging unit provided on a right side of the vehicle body, and the imaging range of which includes a third reference position and a fourth reference position that is positioned differently from the third reference position in the advance direction of the vehicle body; and an output unit configured to magnify or minify at least one of the first image data and the second image data in such a way that the first reference position included in the first image data to be displayed on a display device, and the third reference position included in the second image data to be displayed on the display device have vicinity coordinates in a first direction in a display region of the display device which corresponds to the advance direction, and the second reference position included in the first image data, and the fourth reference position included in the second image data have vicinity coordinates in the first direction, and to output the magnified or minified image data items, when the first image data and the second image data are output to the display device. Accordingly, for example, a deviation between the displayed right and left wheels does not occur, and thus it is possible to improve visibility, and to reduce burden in driving the vehicle.

Supplementary Note 2

In the periphery monitoring apparatus, the acquisition unit acquires the first image data and the second image data. The first image data is image data captured by the first imaging unit provided on the left side of the vehicle body, and the imaging range of the first image data includes a left front wheel of the vehicle body as the first reference position, and a left rear wheel of the vehicle body as the second reference position which is positioned differently from the first reference position in the advance direction of the vehicle body. The second image data is image data captured by the second imaging unit provided on the right side of the vehicle body, and the imaging range of the second image data includes a right front wheel as the third reference position, and a right rear wheel as the fourth reference position which is positioned differently from the third reference position in the advance direction of the vehicle body. For example, a deviation between the displayed right and left wheels does not occur, and thus it is possible to improve visibility, and to reduce burden in driving the vehicle.

Several embodiments of this disclosure have been described, and these embodiments are presented as examples, and are not intended to limit the scope of this disclosure. New embodiments can be realized in other various forms, and omissions, replacements, and changes can be made in various forms insofar as these omissions, replacements, and changes do not depart from the purport of this disclosure. The embodiments and the modification are included in the scope and purport of this disclosure, and are included in this disclosure disclosed in the claims, and the equivalent range.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery monitoring apparatus comprising:
   an acquisition unit configured to acquire first image data that is captured by a first imaging unit provided on a left side of a vehicle body, and second image data that is captured by a second imaging unit provided on a right side of the vehicle body; and
   an output unit configured to combine third image data which is generated by rotating, and magnifying or minifying the first image data in such a way that a plurality of left reference points included in the first image data are respectively displayed at pre-set positions, and fourth image data which is generated by rotating, and magnifying or minifying the second image data in such a way that a plurality of right reference points included in the second image data are respectively displayed at pre-set positions, and to output the combined image data; and
   wherein the acquisition unit acquires the first image data, the imaging range of which includes a first reference point, a second reference point that is separated from the first reference point in an advance direction of the vehicle body, and a third reference point that is separated from the first reference point in a direction perpendicular to the advance direction of the vehicle body as the plurality of left reference points, and the second image data, the imaging range of which includes a fourth reference point, a fifth reference point that is separated from the fourth reference point in the advance direction of the vehicle body, and a sixth reference point that is separated from the fourth reference point in the direction perpendicular to the advance direction of the vehicle body as the plurality of right reference points.

2. The periphery monitoring apparatus according to claim 1, further comprising:
   a storage unit configured to store left angular information for rotating the first image data based on the inclination of the first imaging unit provided on the left side of the vehicle body, and right angular information for rotating the second image data based on the inclination of the second imaging unit provided on the right side of the vehicle body,
   wherein the output unit combines the third image data that is generated by rotating, and magnifying or minifying the first image data according to the left angular information, and the fourth image data that is generated by rotating, and magnifying or minifying the second image data according to the right angular information, and outputs the combined image data.

3. The periphery monitoring apparatus according to claim 1, further comprising:
   a storage unit configured to store left range specifying information for magnifying or minifying the first image data based on positional information regarding the first imaging unit provided in the vehicle body, and right range specifying information for magnifying or minifying the second image data based on positional information regarding the second imaging unit provided in the vehicle body,
   wherein the output unit combines the third image data that is generated by rotating the first image data, and magnifying or minifying the first image data according to the left range specifying information, and the fourth image data that is generated by rotating the second image data, and magnifying or minifying the second image data according to the right range specifying information, and outputs the combined image data.

4. The periphery monitoring apparatus according to claim 1,
   wherein when distortion induced by a wide-angle lens of each of the first imaging unit and the second imaging unit is corrected, the output unit outputs the third image data and the fourth image data generated by performing a distortion correction process at a distortion correction rate which is set such that distortion in an outer circumferential region of each of the first image data and the second image data remains un-eliminated to some extent so as to display a predetermined range of external environment of the vehicle body.

5. The periphery monitoring apparatus according to claim 1, further comprising:
   a setting unit calculates a magnification and minification rate in such a way that the first reference point in the captured image data is set to be at a predetermined position in a display region of a display device, and the second reference point and the third reference point in the image data are positioned on an outer circumference of the display region of the display device: and
   the setting unit calculates a magnification and minification rate in such a way that the fourth reference point in the captured image data is set to be at a predetermined position in a display region of the display device, and the fifth reference point and the sixth reference point and in the image date are positioned on an outer circumference of the display region of the display device.

6. A periphery monitoring system comprising:
   a first imaging unit that is provided on a left side of a vehicle body and captures an image of the vicinity of the left side of the vehicle body;
   a second imaging unit that is provided on a right side of the vehicle body and captures an image of the vicinity of the right side of the vehicle body;
   an acquisition unit configured to acquire first image data captured by the first imaging unit, and second image data captured by the second imaging unit; and
   a display unit configured to combine third image data which is generated by rotating, and magnifying or minifying the first image data in such a way that a plurality of first reference points included in the first image data are respectively displayed at pre-set first positions, and fourth image data which is generated by rotating, and magnifying or minifying the second image data in such a way that a plurality of second reference points included in the second image data are respectively displayed at pre-set second positions, and to display the combined image data; and
   wherein the acquisition unit acquires the first image data, the imaging range of which includes a first reference point, a second reference point that is separated from the first reference point in an advance direction of the vehicle body, and a third reference point that is separated from the first reference point in a direction perpendicular to the advance direction of the vehicle body as the plurality of left reference points, and the second image data, the imaging range of which includes a fourth reference point, a fifth reference point that is separated from the fourth reference point in the advance direction of the vehicle body, and a sixth reference point that is separated from the fourth reference point in the direction perpendicular to the advance direction of the vehicle body as the plurality of right reference points.

7. A periphery monitoring apparatus comprising:

an acquisition unit configured to acquire first image data which is captured by a first imaging unit provided on a left side of a vehicle body, and second image data which is captured by a second imaging unit provided on a right side of the vehicle body, wherein the imaging range of the first image data includes a first reference position and a second reference position that is positioned differently from the first reference position in an advance direction of the vehicle body, and the imaging range of the second image data includes a third reference position and a fourth reference position that is positioned differently from the third reference position in the advance direction of the vehicle body, the periphery monitoring apparatus further comprises:

an output unit configured to magnify or minify at least one of the first image data and the second image data in such a way that the first reference position included in the first image data to be displayed on a display device, and the third reference position included in the second image data to be displayed on the display device have vicinity coordinates in a first direction in a display region of the display device which corresponds to the advance direction of the vehicle body, and the second reference position included in the first image data, and the fourth reference position included in the second image data have vicinity coordinates in the first direction, and to output the magnified or minified image data items, when the first image data and the second image data are output to the display device; and wherein the acquisition unit acquires the first image data, the imaging range of which includes a first reference point, a second reference point that is separated from the first reference point in an advance direction of the vehicle body, and a third reference point that is separated from the first reference point in a direction perpendicular to the advance direction of the vehicle body as the plurality of left reference points, and the second image data, the imaging range of which includes a fourth reference point, a fifth reference point that is separated from the fourth reference point in the advance direction of the vehicle body, and a sixth reference point that is separated from the fourth reference point in the direction perpendicular to the advance direction of the vehicle body as the plurality of right reference points.

8. The periphery monitoring apparatus according to claim 7, wherein the imaging range of the first image data includes a left front wheel of the vehicle body as the first reference position, and a left rear wheel of the vehicle body as the second reference position which is positioned differently from the first reference position in the advance direction of the vehicle body, and wherein the imaging range of the second image data includes a right front wheel of the vehicle body as the third reference position, and a right rear wheel of the vehicle body as the fourth reference position which is positioned differently from the third reference position in the advance direction of the vehicle body.

* * * * *